(12) United States Patent
Fuse

(10) Patent No.: US 6,552,447 B1
(45) Date of Patent: Apr. 22, 2003

(54) POWER SUPPLYING APPARATUS, IMAGE FORMING APPARATUS AND METHOD OF CONTROLLING THE SAME

(75) Inventor: Hiroyuki Fuse, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 54 days.

(21) Appl. No.: 09/661,567

(22) Filed: Sep. 14, 2000

(51) Int. Cl.[7] .................................................. H01F 1/00
(52) U.S. Cl. .............................. 307/68; 307/83; 399/37
(58) Field of Search ............................... 307/43, 68, 83, 307/87; 399/37; 347/129

(56) References Cited

U.S. PATENT DOCUMENTS

| | | | | |
|---|---|---|---|---|
| 4,481,604 A | * | 11/1984 | Gilham et al. ................. | 101/91 |
| 5,285,368 A | * | 2/1994 | Ishikawa ................. | 363/21.05 |
| 5,767,501 A | * | 6/1998 | Schmidt et al. ........ | 235/462.45 |
| 6,335,748 B1 | * | 1/2002 | Furst .......................... | 347/116 |

FOREIGN PATENT DOCUMENTS

| | | |
|---|---|---|
| JP | 57-157322 | 9/1982 |
| JP | 5-227681 | 9/1993 |
| JP | 6-60580 | 3/1994 |
| JP | 9-147470 | 6/1997 |

* cited by examiner

Primary Examiner—Brian Sircus
Assistant Examiner—Sharon Polk
(74) Attorney, Agent, or Firm—Foley & Lardner

(57) ABSTRACT

A power supply circuit providing voltage for operation, a motor operating powered by the output from this power supply circuit and continuing rotation powered by inertia even after loss of the output and a non-volatile memory are equipped. If the output voltage of the power supply circuit decreases, the control is continued by utilizing the voltage generated in the motor due to its inertial rotation, the data that has been used for controlling is saved on the non-volatile memory, and then access to the non-volatile memory is prohibited.

8 Claims, 6 Drawing Sheets

POWER SUPPLYING APPARATUS, IMAGE FORMING APPARATUS AND METHOD OF CONTROLLING THE SAME

BACKGROUND OF THE INVENTION

Image forming apparatus such as copiers, facsimiles and printers forms an invisible electro-static image on a photoconductive drum, which is an image carrier, by scanning its surface with semiconductor laser, for example, laser beams emitted from a laser diode, and prints the invisible electro-static image onto paper to make it visible by the use of a developing agent (toner).

The laser beam emitted from a laser diode hits a galvanometer mirror to be reflected there and then proceeds to a polygon mirror. The laser beam, reflected by the polygon mirror, scans the surface of a photoconductive drum along the axis of the drum, driven by rotational movements of the polygon mirror. This scanning performed along the drum axis is referred to as main scanning. The main scanning is repeated, driven by the rotating photoconductive drum. The direction of the shift of repeated main scanning conducted on the photoconductive drum (perpendicular to the direction of the main scanning) is referred to as sub-scanning direction. The position of the laser beam irradiation in the sub-scanning direction is adjusted by the galvanometer mirror.

In such image forming apparatus, if a user switches off the machine by mistake, the power line is unplugged, or the commercial power service fails, the process including image formation is interrupted. In such cases, the data under use for the control of image formation has to be saved on a non-volatile memory so as not to be lost. Furthermore, after the data has been saved, a process is required that prohibits access to the non-volatile memory to protect the data saved in the non-volatile memory.

Although it is the control unit of the apparatus that conducts this process, the power supply to this control unit has also been cut off when it is supposed to carry out such a process. For the implementation of this process, the power required to continue operation must be set aside somewhere in advance to be ready for use by the control unit.

As a means for storing power for operation, a capacitor for power smoothing may be used in the power supply circuit of the apparatus.

The power supply circuit includes a transformer that transforms the source AC voltage, a regulator circuit that regulates the secondary voltage of this transformer, and a capacitor for smoothing the output DC voltage provided from the regulator circuit. In the power smoothing capacitor, charge remains for a short time after the power supply has failed. This residual charge can make the control unit continue its operation even after the stop of power supply.

However, the capacity of common power smoothing capacitors is not high enough to ensure the completion of the above process.

To complete the above process, a capacitor of a great capacity has to be employed as the power smoothing capacitor. However, the use of such a smoothing capacitor of a large capacity leads to a larger power supply circuit. In addition, there is another disadvantage that such a capacitor of a large capacity is expensive.

BRIEF SUMMARY OF THE INVENTION

It is, therefore, the object of the present invention to provide a power supplying apparatus, an image forming apparatus and method of controlling the same those can ensure the completion of the necessary process in case of the shutoff of power supply without employing a power smoothing capacitor of a high capacity.

The power supplying apparatus according to this invention has a power supply circuit that transforms the AC voltage into DC voltage; a motor that operates powered by the output of the power supply circuit and continues to run by inertial rotation even after loss of the output; at least one non-volatile memory for data saving; and a control unit that operates powered by the output of the power supply circuit, operates powered by the voltage generated in the motor rotating by inertia, saves the data that has been used for controlling when the output voltage of the power supply circuit decreases and then prohibits access to the non-volatile memory after the data saving.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The following is an explanation of a first embodiment of the present invention.

Figure 1:
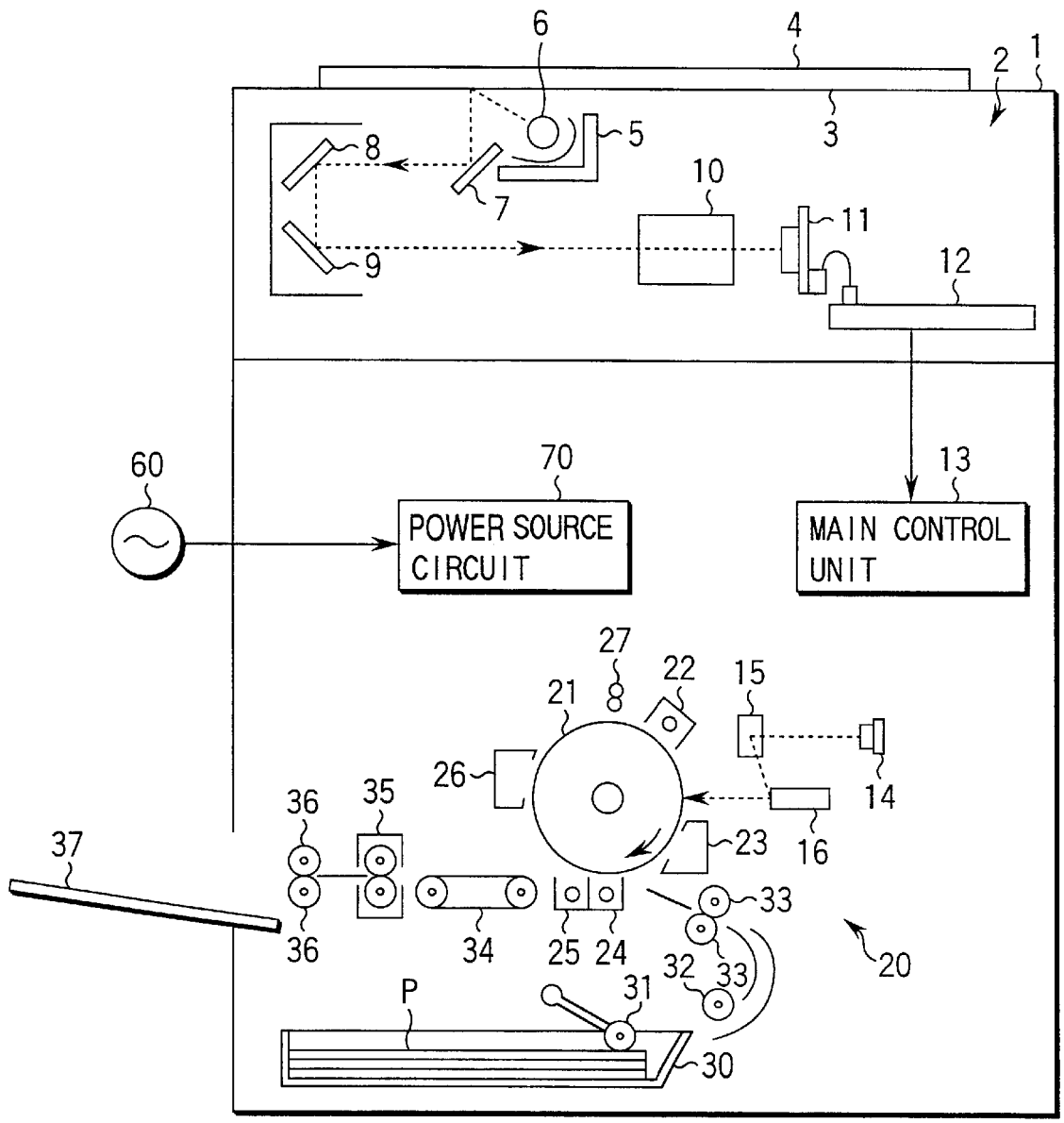
FIG. 1 is an overall view illustrating the configuration according to the first embodiment of the invention.

In FIG. 1, the image forming apparatus itself is numbered 1, having a reader 2, printer 20 and power supply circuit 70 in it.

A document table 3 is mounted on the top of the printer 2 and a document cover 4 is attached so that it opens and closes as desired on the document table 3.

A carriage 5 is attached to the bottom of the document table 3 so that it shuttles as desired. The carriage 5 has an exposure lump 6, and the whole range on the document table 3 is scanned while the exposure lump 6 flashes and the carriage 5 shuttles.

This optical scanning provides a reflective image of the document placed on the document table 3 and this reflective image is projected on a CCD sensor 11 through reflecting mirrors 7,8,9 and a scalable lens block 10. The CCD sensor 11 outputs image signals with a voltage level corresponding to the number of received photons. This image signals are sent to an image processing circuit 12. The image processing circuit 12 outputs image data by conducting a series of image handling processes such as shading correction and gamma correction on the image signal. This image data is then sent to a main control unit 13 in the printer 20.

The main control unit 13 drives and controls a laser generator, for example a laser diode 14, in the printer 20, corresponding to the image data. The laser diode 14 emits a laser beam.

The laser beam emitted from the laser diode 14 hits an adjuster, for example a galvanometer mirror 15, being reflected there, and then proceeds to a polarizer, for example, a polygon mirror 16. The laser beam reflected by the polygon mirror 16 scans the surface of an image carrier, for example, a photoconductive drum 21, along the axis of the photoconductive drum 21, driven by the rotation of the polygon mirror 16.

Around the photoconductive drum 21, an electrical charger 22, a developing unit 23, a transfer unit 24, a peeler 25, a cleaner 26 and a destaticizer 27 are arranged. A paper feeder 30 is mounted under the photoconductive drum 21.

The paper feeder 30 has many sheets of paper P. Those sheets P are taken out one by one by a pickup roller 31. The taken out sheet P is removed from the paper feeder 30 by a separator 32 and then sent to resist rollers 33. Each resist roller 33 transports the sheet P to between the photoconductive drum 21 and the transfer unit 24, timed to the rotation of the photoconductive drum 21.

The electrical charger 22 builds up static on the surface of the photoconductive drum 21. With this static charge and the irradiation of laser beams on the photoconductive drum 21, an invisible static image is formed on the photoconductive drum 21.

The developing unit 23 supplies a developing agent to the photoconductive drum 21. The invisible static image on the photoconductive drum 21 becomes visible by the supply of the developing agent. The transfer unit 24 transfers the visible image (developed image) formed on the photoconductive drum 21 onto the sheet paper P that is fed by resist rollers 33. The sheet P is removed from the photoconductive drum 21 by the peeler 25 after the image transfer. The removed sheet P is sent to a fuser 35 by a transport belt 34.

The fuser 35 fuses the developing, agent on the sheet P by heating the sheet of paper P. The sheet P out of the fuser 35 is ejected to a tray 37.

The power supply circuit 70 transforms the commercial AC voltage 60 into a DC voltage and outputs the DC voltage to devices as source voltage.

Figure 2:
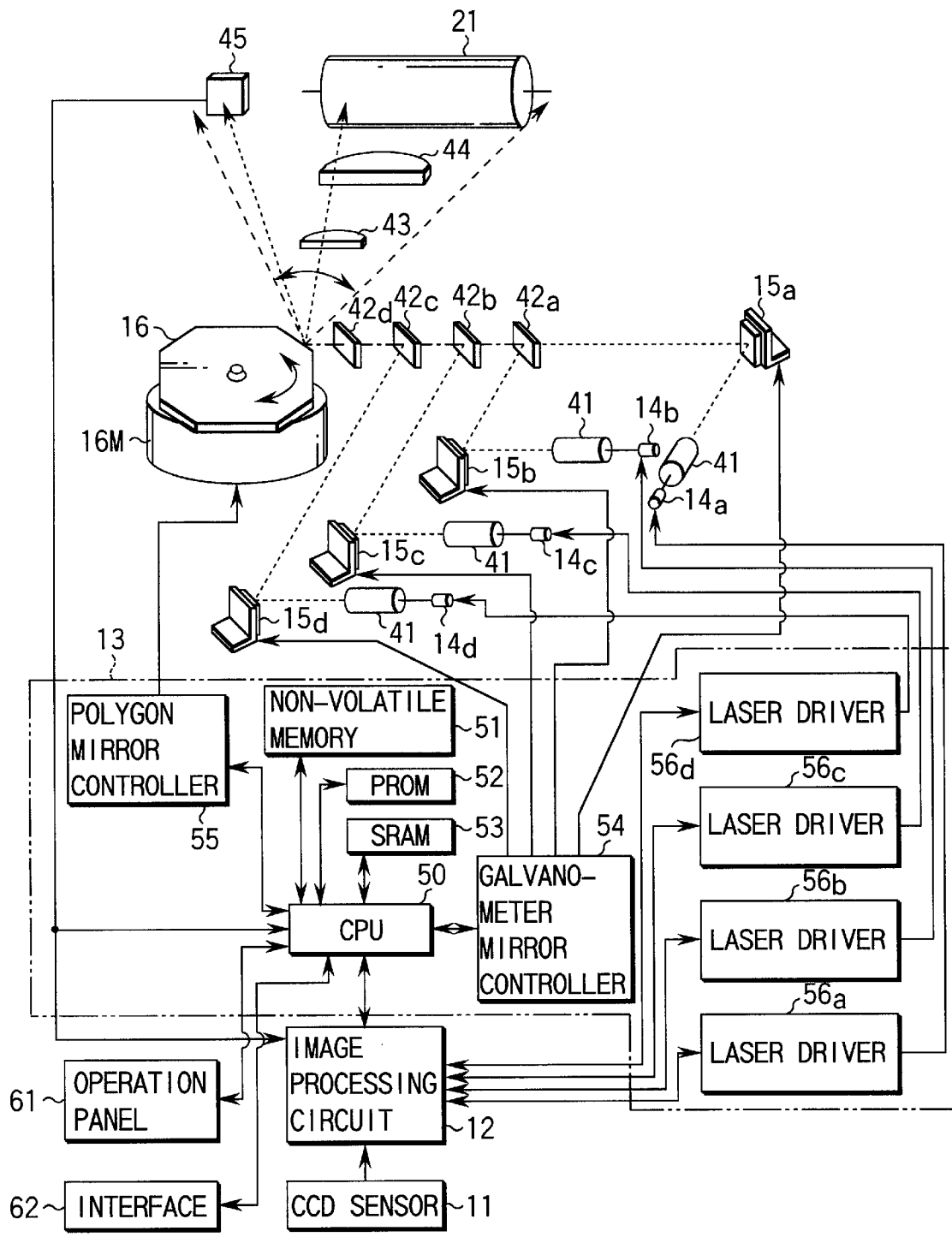
FIG. 2 is a diagram illustrating the major configuration according to the first embodiment of the invention.

FIG. 2 shows the configuration of the peripheral structure of the polygon mirror 16 and the main control unit 13.

The above laser diode 14 comprises four laser diodes 14a, 14b, 14c and 14d. The galvanometer mirror 15 comprises four galvanometer mirrors 15a, 15b, 15cand 15d.

The polygon mirror 16 rotates powered by a motor 16M. The motor 16M is a DC motor that is powered by the output of the power supply circuit 70 and continues to run by inertial rotation even after loss of the output.

Laser beams emitted from laser diodes 14a, 14b, 14c and 14d hit galvanometer mirrors 15a, 15b, 15c and 15d through lenses 41 and are reflected there. The laser beam reflected by the galvanometer mirror 15a passes through half-motors 42b, 42c and 42d and hits the polygon mirror 16. The laser beam reflected by the galvanometer mirror 15b hit the half-motors 42a, reflected there, and hit the polygon mirror 16 after passing through the hail-mirrors 42b, 42c and 42d. The laser beam reflected by the galvanometer mirror 15c hits, the half-mirror, 42b, reflected there, and then hits the polygon mirror 16 after passing through the half-mirror 42c and 42d. The laser beam reflected by the galvanometer mirror 15d hits the half-mirror-42c, reflected there, and hits the polygon mirror 16 after passing through-the half-mirror 42d.

The four laser beams guided to the polygon mirror 16 are separated with specific intervals in the direction vertical to the rotational direction of the polygon mirror 16.

The four laser beams reflected by the polygon mirror 16 scan the surface of the photoconductive drum 21 along its axis, driven by the rotation-of the polygon mirror 16. This scanning performed along the drum axis is referred to as main scanning. The main scanning is repeated, driven by the rotation of the photoconductive drum 21. The direction of the shift of repeated main scanning made on the photoconductive drum 21 (perpendicular to the direction of the main scanning) is referred to as sub-scanning direction.

Lenses 43 and 44 are placed between the polygon mirror 16 and the photoconductive drum 21.

The scanning range of each laser beam covers the whole area from one end of the photoconductive drum 21 to the other end along its axis and the predetermined area extending beyond the end of the photoconductive drum 21. In this predetermined area, a photo detector 45 is mounted.

The photo detector 45 outputs electrical signals when it receives a laser beam. This output is sent to the image processing circuit 12 and the main control unit 13.

The main control unit 13 includes a CPU 50 (central processing unit) serving as the main controller, a non-volatile memory 51 for data saving, a PROM 52 memorizing control programs, an SRAM 53 for temporary data storage, a galvanometer mirror controller 54 controlling galvanometer mirrors 15a, 15b, 15c and 15d, a polygon mirror controller 55 controlling the polygon mirror 16, and laser drivers 56a, 56b, 56c and 56d controlling laser diodes 14a, 14b, 14c and 14d based on the image data provided from the image processing circuit 12.

An operation panel 61 as a means for operation and an interface 62 for auxiliary connection are connected to the CPU 50. The operation panel 61 allows the image formation modes (copy and print modes) selective and sends an order to start image formation. The interface 62 provides a connection to a personal computer, for example.

Figure 3:
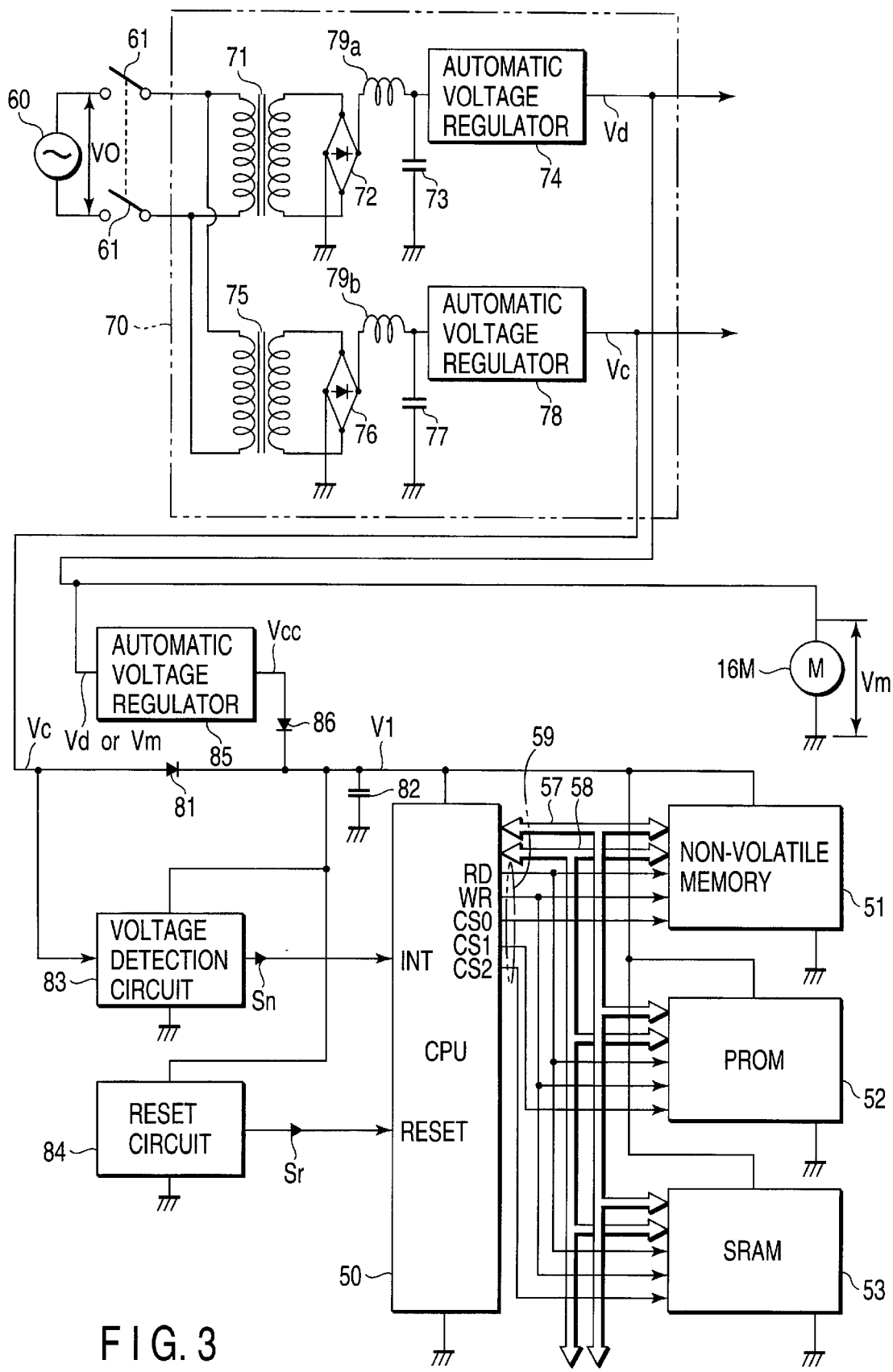
FIG. 3 is a block diagram illustrating the power supply circuit and regulator circuit according to the first embodiment of the invention.

FIG. 3 shows the configuration of the power supply circuit 70, its peripheral parts and the major part of the main control unit 13.

A power supply circuit 70 is connected to the commercial AC voltage source 60 via power switches 61.

The power supply circuit 70 comprises a first transformer 71 that transforms (lowers) voltage Vo of the commercial AC source 60, a first rectifier circuit 72 that rectifies the secondary voltage of the transformer 71, a first choke coil 79a and a first power smoothing capacitor 73 those smoothes the output from the rectifier circuit 72, a first automatic voltage regulator 74 that controls the voltage that has passed the smoothing capacitor 73 to a specific level (24V, for example), a second transformer 75 that transforms (lowers) the commercial AC voltage 60, a second rectifier circuit 76 that rectifies the secondary voltage of the transformer 75, a second choke coil 79b and a second power smoothing capacitor 77 those smoothes the output from the rectifier circuit 76, and a second automatic voltage regulator 78 that controls the voltage that has passed the smoothing capacitor 77 to a specific level (3v, for example). The power supply circuit 70 outputs the output voltage Vd from the automatic voltage regulator 74 as the power source for the operation of the driver system including the motor 16M and the output voltage Vc from the automatic voltage regulator 78 as the power source for the operation of the control system including the main control unit 13.

The voltage Vc is supplied to the power lines of CPU 50, non-volatile memory 51, PROM 52 and SRAM 53, via the diode 81 and a capacitor 82 for noise suppression.

The voltage Vc is also supplied to the power lines of the voltage detection circuit 83 and a reset circuit 84 via the diode 81.

The voltage Vc is further supplied to the detection line of the voltage detection circuit 83. The voltage detection circuit 83 monitors the level of the operating voltage vc and, if this voltage level is equal to or lower than a predetermined value Vth, outputs a shutdown signal Sn to notify CPU 50 of the voltage down. This shutdown signal Sn is sent to the interrupt lines of CPU 50.

The reset circuit 84 outputs a reset signal Sr, corresponding to the voltage level supplied to the power line. This reset signal Sr is sent to the reset line of CPU 50.

On the other hand, the automatic voltage regulator 85 is connected to the connection line between the output of the automatic voltage regulator 74 and the motor 16M. The automatic voltage regulator 85 controls the voltage in the connection line between the output of the automatic voltage regulator 74 and the motor 16M (vd, or Vm generated in the motor by inertial rotation) to a specific level Vcc (for example 3V), and then outputs the voltage Vcc as the operating voltage for the main control unit 13. The output electrode of the automatic voltage regulator 85 is connected to the anode of the diode 81.

CPU 50 and the non-volatile memory 51 are coupled via data bus 57, address bus 58 and signal control lines 59. CPU 50 and PROM 52 are coupled via the data bus 57, address bus 58 and signal control lines 59. CPU 50 and SRAM 53 are also coupled via the data bus 57, address bus 58 and signal control lines 59.

Figure 4:
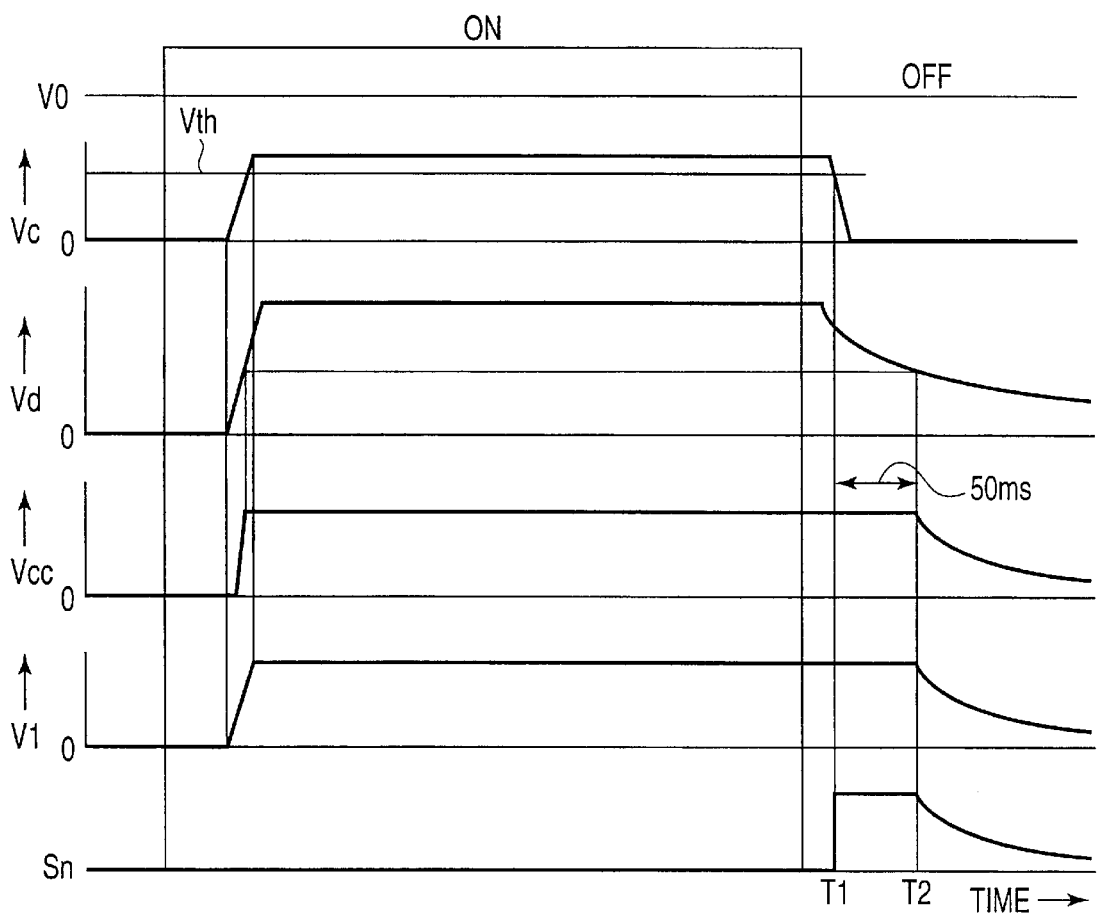
FIG. 4 is a chart illustrating the waveforms of voltage signals sent from elements described in FIG. 3.

Referring now to FIG. 4, an explanation is provided to demonstrate how the present invention works.

When the power switches 61 are turned on, the power supply circuit 70 outputs voltages Vd and Vc. Vd powers the motor 16M of the polygon mirror 16, while Vc powers the main control unit 13.

If a user switches off the switches 61 by mistake, the power line is unplugged, or the commercial power supply fails, then the supply of power source voltage Vo to the power supply circuit 70 is shut off and the output voltages Vd and Vc from the power supply circuit 70 become zero.

Figure 5:
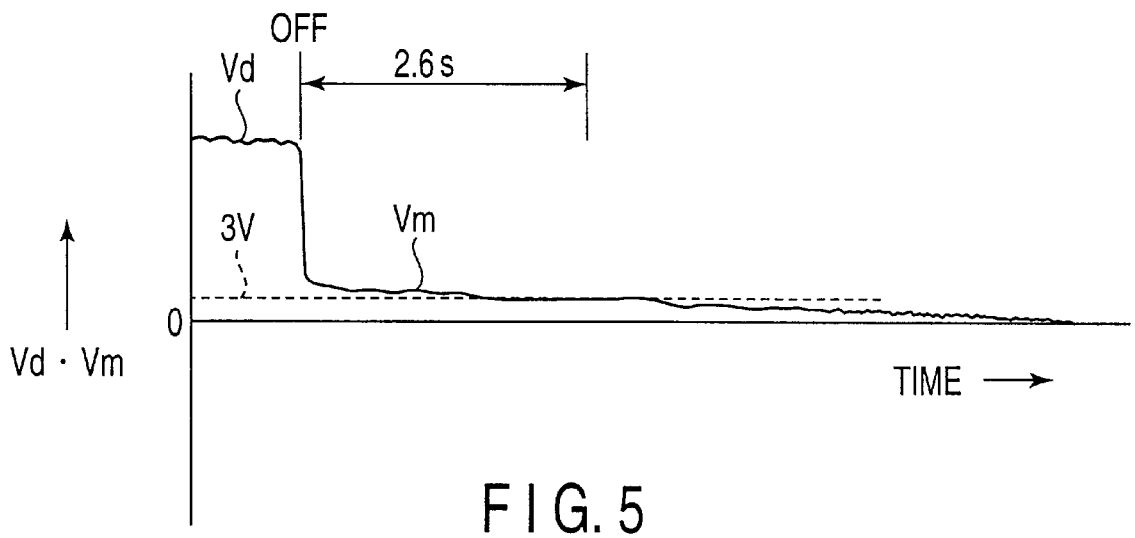
FIG. 5 is a chart illustrating the waveforms of voltage signals sent from the motor according to the first embodiment of the invention.
Figure 6:
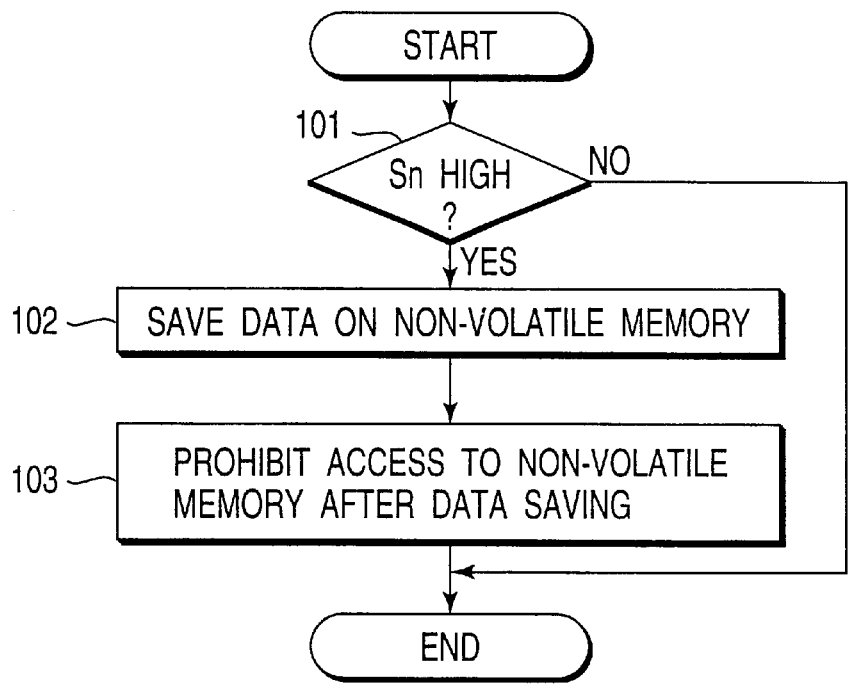
FIG. 6 is a flow diagram illustrating the control process in the control unit according to the-first embodiment of the invention.

In this case, the motor 16 continues to run by inertia even after the output voltage Vd has become zero. As long as this inertial rotation continues, a voltage Vm is generated in the motor 16M. As shown in FIG. 5, the level of Vm remains at 3V or higher for 2.6 seconds, for example, since the output voltage Vd became zero. This magnitude of voltage, 3V, is that required to keep the operation of the main control unit 13.

The voltage Vm generated in the motor 16M is supplied to the anode of the diode 81 via the automatic voltage regulator 85 and the diode 86. Then a voltage V1 is held in the anode of the diode 81 even if the output voltage vc becomes zero, and the operations of CPU 50, voltage detection circuit 83 and reset circuit 84 are maintained by this voltage V1.

When the output voltage Vc becomes zero, the shutdown signal Sn sent from the voltage detection circuit 83 stands at a high level rising from a low level. Then CPU 50 running powered by the voltage supplied from the motor 16M, in response to the rise of the shutdown signal Sn (YES in step 101), saves crucial data under use for controlling on the non-volatile memory 51 (step 102), and then prohibits access (writing or reading data) to the non-volatile memory 51 (step 103).

Namely, the crucial data that was used in the control of image formation is saved on the non-volatile memory 51 by this data saving process on the non-volatile memory 51. Further, the saved data is not disturbed in the non-volatile memory 51, since the access to the non-volatile memory 51 has:been prohibited.

After the output voltage vc has become zero, CPU 50 continues to run at least 50 ms. The-duration of time 50 ms is long enough for the CPU to securely complete the data saving on the non-volatile memory 51 and the process to prohibit the access to the non-volatile memory 51, and also the duration of time 50 ms is short than the duration of time 2.6 seconds in FIG. 5.

As described above, if the supply of the power source voltage Vo is shut off, since the operating power required to continue the operation of the motor 16M is secured by the electromotive power based on the inertial rotation of the motor 16, the processes needed in case of a power failure can be completed.

Therefore, since the power smoothing capacitors 73 and 77 need not to have a function of securing operating power, a large capacity is not required for the smoothing capacitors 73 and 77. Upsizing of the power supply circuit 70 is thereby prevented. In addition, expensive smoothing capacitors with a large capacity are not necessary and a rise in cost can be prevented in such a simple configuration utilizing the electromotive power of the existing motor 16M.

Figure 7:
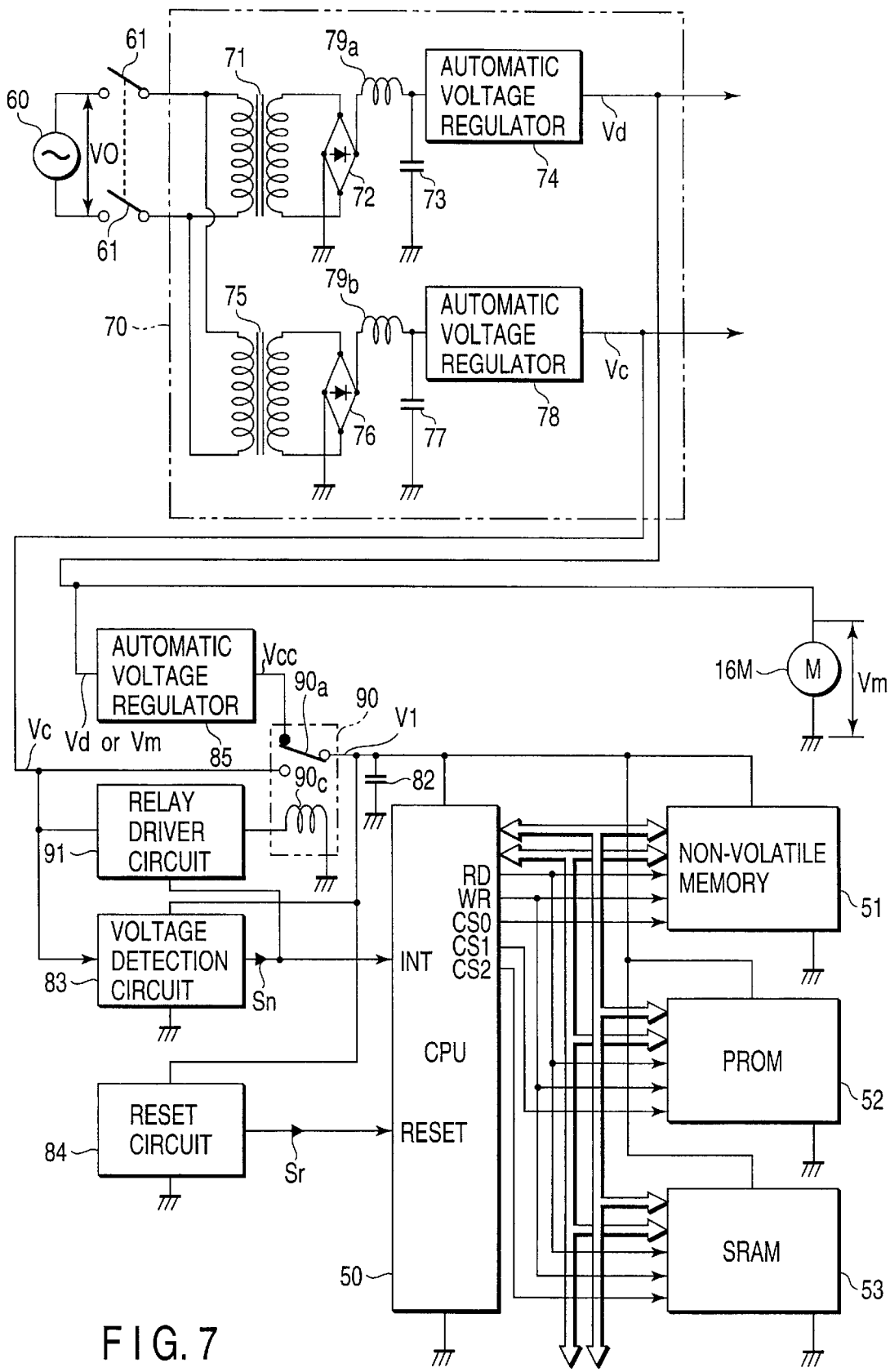
FIG. 7 is a block diagram illustrating the power supply circuit and regulator circuit according to the second embodiment of the invention.

It is appreciated by those skilled in the art that the diodes 81 and 86 may be replaced by a relay 90 and a relay driving circuit 91 as shown in FIG. 7.

The relay 90 has a bi-directional contact 90a and a coil 90c. The voltage Vc is supplied to this coil 90c through the relay driving circuit 91.

While the output voltage Vc is normally output from the power supply circuit 70, the shutdown signal Sn of the voltage detection circuit 83 stays at a low level and voltage Vc is output from the relay circuit 91. The coil 90c in the relay 90 is thereby shunted, closing the normally open side of the bi-directional contact 90a (the normally closed side opens). When the normally open side closes, the voltage Vc is supplied to the main control unit 13 as operating voltage.

When the supply of the source voltage Vo is shut off and the output voltage Vc of the power supply circuit 70 becomes zero, the shutdown signal Sn rises to a high level from a low level. Then the voltage Vc is not supplied from the relay circuit 91, and the shunt of the coil 90c is released, closing the normally closed side of the bi-directional contact 90a (the normally open side opens). When the normally closed side closes, the voltage Vcc based on the electromotive force of the motor 16M is supplied to the main control unit 13 as operating power.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supplying apparatus comprising:
   a power supply circuit which transforms the AC voltage into a DC voltage;
   a motor which operates with the output voltage of the power supply circuit and continues rotation by inertia after the loss of the output voltage;
   at least one non-volatile memory which saves data; and
   a control unit which operates with the output voltage of the power supply circuit, operates with the generated voltage of the motor by the inertial rotation of the motor when the output voltage of the power supply circuit decreases, saves the data on said non-volatile memory when the output voltage from the power supply circuit decreases, and prohibits access to the non-volatile memory after saving the data,
   wherein the power supply circuit comprises a first transformer which transforms the AC voltage, a second transformer which transforms the AC voltage, a first rectifier circuit which rectifies the secondary voltage of the first transformer, a second rectifier circuit which rectifies the secondary voltage of the second transformer, a first smoothing capacitor which smoothes the output voltage of the first rectifier circuit, a second smoothing capacitor which smoothes the output voltage of the second rectifier circuit, a first voltage regulator which controls the voltage of the first smoothing capacitor at a constant level, and a second voltage regulator which controls the voltage of the second smoothing capacitor at a constant level, and the output voltage of the first voltage regulator is output as an operating voltage for the motor and the output voltage of the second voltage regulator is output as an operating voltage for the control unit.

2. The power supplying apparatus according to claim 1, wherein the motor drives specific parts in the apparatus.

3. The power supplying apparatus according to claim 1, further comprising a voltage regulator which controls the generated voltage of the motor at a constant level and outputs the voltage of the constant level as an operating voltage for the control unit.

4. The power supplying apparatus according to claim 1, further comprising a voltage detection circuit which detects the level of the output voltage of the power supply circuit and outputs a notifying signal to the control unit when the detected voltage level becomes equal to or lower than a predetermined value.

5. An image forming apparatus comprising:
   an image carrier;
   a laser generator which emits a laser beam for scanning to the image carrier,
   a power supply circuit which transforms the AC voltage into a DC voltage;
   a motor which operates with the output voltage of the power supply circuit and continues rotation by inertia after the loss of the output voltage,
   a mirror which rotates with the power of the motor and reflects the laser beam emitted from the laser generator to the image carrier for scanning;
   at least one non-volatile memory which saves data; and
   a control unit which operates with the output voltage of the power supply circuit, operates with the generated voltage of the motor by the inertial rotation of the motor when the output voltage of the power supply circuit decreases, saves the data on said non-volatile memory when the output voltage from the power supply circuit decreases, and prohibits access to the non-volatile memory after saving the data,
   wherein the power supply circuit comprises a first transformer which transforms the AC voltage, a second transformer which transforms the AC voltage, a first rectifier circuit which rectifies the secondary voltage of the first transformer, a second rectifier circuit which rectifies the secondary voltage of the second transformer a first smoothing capacitor which smoothes the output voltage of the first rectifier circuit, a second smoothing capacitor which smoothes the output voltage of the second rectifier circuit, a first voltage regulator which controls the voltage of the first smoothing capacitor at a constant level, and a second voltage regulator which controls the voltage of the second smoothing capacitor at a constant level, and the output voltage of the first voltage regulator is output as an operating voltage for the motor and the output voltage of the second voltage regulator is output as an operating voltage for the control unit.

6. The power supplying apparatus according to claim 5, further comprising a voltage regulator which controls the generated voltage of the motor at a constant level and outputs the voltage of the constant level as an operating voltage for the control unit.

7. The power supplying apparatus according to claim 5, further comprising a voltage detection circuit which detects the level of the output voltage of the power supply circuit and outputs a notifying signal to the control unit when the detected voltage level becomes equal to or lower than the predetermined value.

8. A controlling method of an apparatus having a power supply circuit which supplies an operating voltage, a motor which operates with the output voltage of the power supply circuit and continues rotation by inertia after the loss of the output voltage, and a non-volatile memory, the method comprising:
   controlling the apparatus with the generated voltage of the motor by the inertial rotation of the motor when the output voltage of the power supply circuit decreases;
   saving the data on the non-volatile memory when the output voltage from the power supply circuit decreases, and
   prohibiting access to the non-volatile memory after saving the data.

* * * * *